United States Patent [19]
Göpfrich et al.

[11] Patent Number: 6,075,425
[45] Date of Patent: Jun. 13, 2000

[54] DAMPING FILTER ARRANGEMENT FOR CONVERTERS HAVING A REGULATED VOLTAGE SOURCE AND SINUSOIDAL PHASE CURRENTS

[75] Inventors: Kurt Göpfrich, Erlangen; Manfred Karasek, Steinheim, both of Germany

[73] Assignee: Siemens Aktiengesellschaft, München, Germany

[21] Appl. No.: 09/229,727

[22] Filed: Jan. 13, 1999

[30] Foreign Application Priority Data

Jan. 14, 1998 [DE] Germany ............................ 29 800 567

[51] Int. Cl.⁷ .................................................. H03H 7/06
[52] U.S. Cl. ........................ 333/181; 333/172; 333/177; 307/105; 363/47
[58] Field of Search .................................... 333/167, 172, 333/177, 181; 307/105; 363/39, 45, 47

[56] References Cited

U.S. PATENT DOCUMENTS

| | | | |
|---|---|---|---|
| 5,619,079 | 4/1997 | Wiggins et al. | 307/105 X |
| 5,850,336 | 12/1998 | Nakajima | 363/39 |
| 5,926,382 | 7/1999 | Dähler | 363/39 X |

OTHER PUBLICATIONS

Brosch: "Moderne Stromrichterantriebe", 1.Aufl., Würzburg, Vogel–Verlag, 1989, S.91f.*

Primary Examiner—Justin P. Bettendorf
Attorney, Agent, or Firm—Kenyon & Kenyon

[57] ABSTRACT

A power-line filter for operation with a converter is provided having a regulated voltage source and sinusoidal phase currents, with the power-line filter helping to eliminate interference voltages particularly in the frequency range from 2 kHz to 150 kHz, which are normally not taken into account. The leakage currents to ground, in this context, can be minimized to the point that it is possible to operate the converter in an (AC/DC sensitive) Interference Filter (IF) protective circuit-breaker.

7 Claims, 3 Drawing Sheets

DAMPING FILTER ARRANGEMENT FOR CONVERTERS HAVING A REGULATED VOLTAGE SOURCE AND SINUSOIDAL PHASE CURRENTS

FIELD OF THE INVENTION

The present invention relates to a filter arrangement for damping line-conducted low- and high-frequency system perturbations, in particular for selective damping in the frequency range of 2 kHz to 150 kHz, for converters having a regulated voltage source and sinusoidal phase currents, the filter arrangement being arranged between the power output (line) and the input (load) of the converter.

BACKGROUND INFORMATION

In the operation of a converter having a voltage source, system perturbations (line-conducted interference voltages) are inevitable. In this context, the spectrum of interference voltages can be subdivided into four frequency ranges:

| 1. | 0 Hz ... 2 kHz |
|----|----------------|
| 2. | 2 kHz ... 9 kHz |
| 3. | 9 kHz ...150 kHz |
| 4. | 150 kHz ... 30 MHZ |

For the fourth frequency range, there are binding limiting values (limiting value class A/B) which, in the context of the Council of Europe Declaration of Conformity, must be observed with regard to electromagnetic compatibility (EC). Limiting values for the second frequency range are already in the planning stage.

The requirements of power stations, in particular of VDEW (Association of German Power Stations), with regard to improving the power factor, relate to the first frequency range and cannot be met using a three-phase bridge circuit such as the conventional B6-bridge (see Brosch: "Modern Power Converter Drives," first edition, Wurzburg, Vogel Printing House, 1989, p. 91ff). For meeting these requirements, a converter having sinusoidal current input is necessary.

Thus, the spectrum of interferences is shifted to the second and the third frequency range. In this context, one advantage is that in this frequency range the interferences can be filtered out at reasonable expense.

However, for the operation of a converter having a regulated voltage source, the second and third frequency ranges are of decisive importance even apart from the question of limiting values. In this frequency range, the interference voltage is very high and, as a result of the offending noise, it can lead to interference with other units being operated on the same power system.

Conventional power-line filters have been developed for the fourth frequency range and for the operation of converters using B6-bridge circuits (with an unregulated voltage source). Nevertheless, the frequency ranges below that are still not taken into account.

In the operation of converters having a regulated voltage source, in a filter of this type, resonances can lead to a magnification of the interference voltages and thus to a worsening of the problems described.

SUMMARY INFORMATION

An object of the present invention is to create a filter arrangement for the second and third frequency ranges.

This object is achieved according to the present invention by providing a symmetrical filter part, including, in each case, a capacitor associated with each power phase for reducing the amplitude of the interference voltages. Downstream of the capacitor, a parallel circuit is arranged which includes a damping resistor for damping the resonance frequency and an inductor for the power frequency-recharging current. An asymmetrical filter part composed of a symmetrical filter means is provided in a star connection of further downstream capacitors, whose star point is connected to the system ground via a further parallel circuit composed of a capacitor and a damping resistor.

In converters capable of feedback, in order to avoid undamped oscillations between the input and the output side of the converter, a first advantageous embodiment of the filter arrangement according to the present invention, in a further filter step, has further capacitors on the converter side, the capacitors being connected in star connection between the power phases, their star point being connected to the system ground via a damping resistor.

In an alternative advantageous embodiment of the filter arrangement according to the present invention, in a further filter step, an inductor is provided on the converter side for each phase, the inductors having at their disposal a common core and a further winding for coupling a damping resistor.

In order to optimally avoid a magnification of the resonance of asymmetrical currents, a further advantageous embodiment of the filter arrangement according to the present invention is characterized in that the damping resistor of the asymmetrical filter part has a value $$R > 2 * \sqrt{Lres/Cres}$$

with Lres, Cres=the resulting inductance, capacitance of the series resonant circuit.

In a further advantageous embodiment of the filter arrangement according to the present invention, a damping resistor of the asymmetrical filter part is provided, the damping resistor being arranged as a PTC resistor.

For example, in case the filter is operated erroneously on an IT-power system, the embodiments according to the present invention have the following advantage: in response to a short circuit between phase and ground, the PTC-resistor (a positive temperature coefficient) becomes highly resistant. This process is reversible, i.e., the power-line filter is not destroyed.

The principle of the present invention can be transferred particularly advantageously to filter arrangements which come about through a star-delta-transformation or a delta-star-transformation.

DETAILED DESCRIPTION

Figure 1:
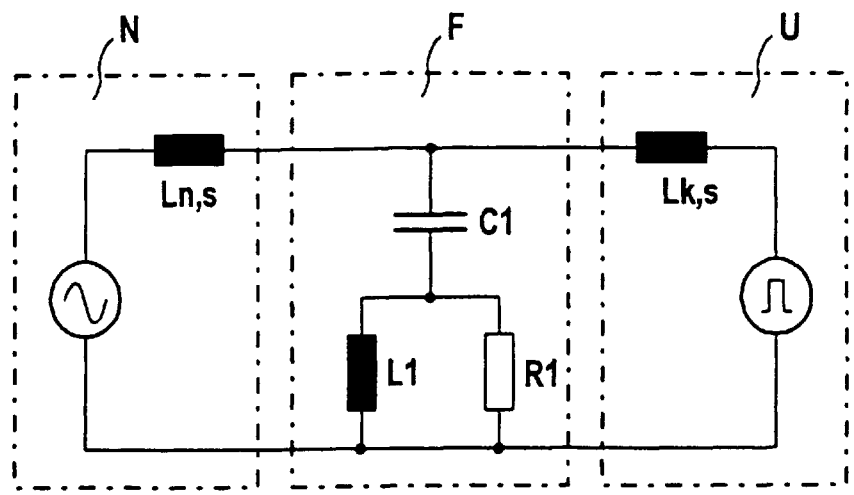
FIG. 1 shows an equivalent circuit diagram for the symmetrical part of the power-line filter in accordance with the present invention.

An equivalent circuit diagram for the symmetrical part of the power-line filter according to the present invention is shown in FIG. 1.

The symmetrical part of the power-line filter is made up of an electric power supply system N, filter arrangement F, and a converter U. The power supply system N has a symmetrically effective system inductor, and the converter U has a symmetrically effective commutating reactor. Filter arrangement F shows the symmetrical filter part composed of a series circuit connected in parallel to the system output and to the converter input, made up of a capacitor C1 and a parallel circuit composed of an inductor L1 having a damping resistor R1.

In this context, Ln,s is the symmetrically effective system inductor and Lk,s is the symmetrically effective inductor of the commutating reactor.

Without the use of a filter, the amplitude of the interferences in the power supply system is determined by the inductive voltage divider composed of Lk,s and Ln,s in accordance with the following computational procedure:

$$G(j\omega) = \frac{usn}{us} = \frac{Ln,s}{Ln,s + Lk,s} \qquad (1)$$

In a first step, using a capacitor C1, the amplitude of the interference voltage is reduced to a desired value. The transfer function for this case is then:

$$G(j\omega) = \frac{1}{1 - \omega^2 LC_1} \Rightarrow f_0 = \frac{1}{2\pi\sqrt{LC_1}} \qquad (2)$$

In this context, L is equal to the parallel circuit of Ln,s and Lk,s.

As is clear, the resonance frequency can be displaced over a large range by the system impedance. By limiting the system impedance, this range would be reduced, but this is not practicable in reality. Therefore, there will always be power supply conditions which lead to a magnification of the resonance of the interference spectrum.

In the next step, therefore, this point of resonance is damped using damping resistor R1. The disadvantage of this is the great power loss of the resistor based on the 50 Hz fundamental wave of the system voltage.

The 50 Hz-recharging currents, therefore, can be taken over by a reactor L1. The latter then simultaneously also raises the minimum impedance in the circuit without having to carry load current. Therefore, a relatively small and thus cost-effective reactor can be used.

Figure 2:
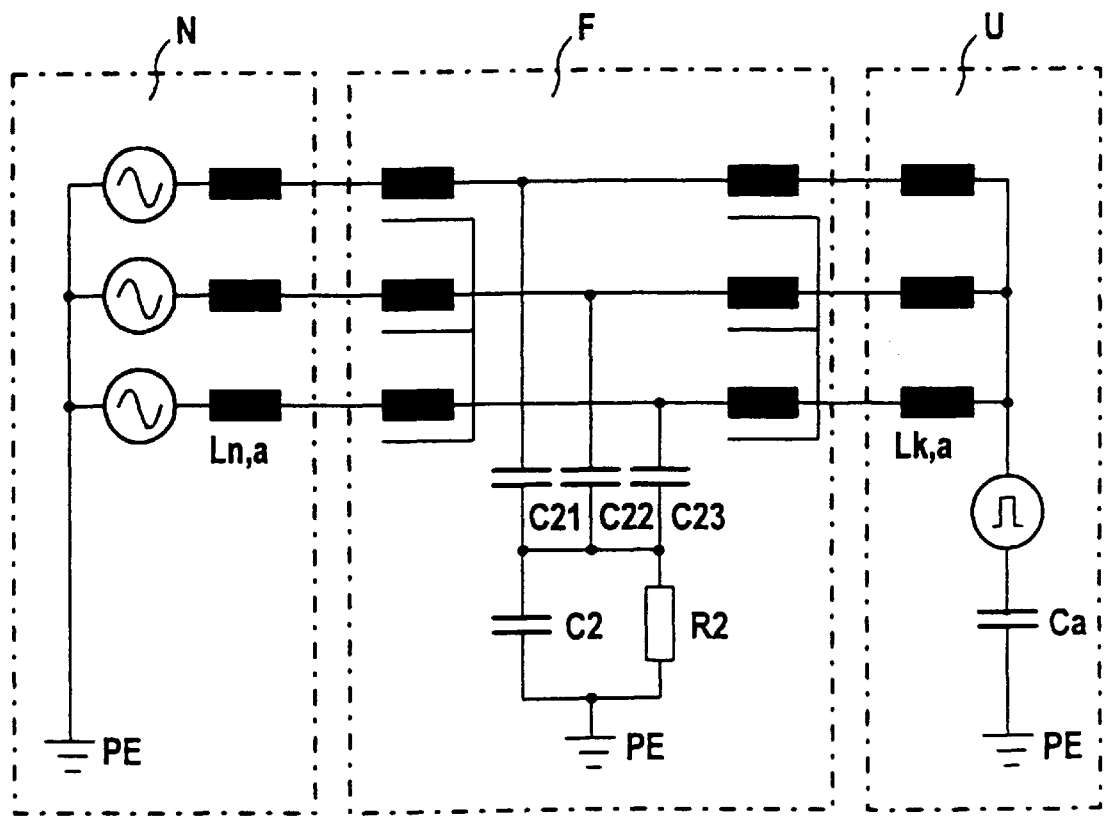
FIG. 2 shows an equivalent circuit diagram for the asymmetrical part of the power-line filter in accordance with the present invention.

In the representation according to FIG. 2, an equivalent circuit diagram is shown for the asymmetrical part of the power-line filter.

On the left side again, an electric power system N is shown, in this case on the basis of a 3-phase system having asymmetrically effective system inductors. The electric power system N is connected to the asymmetrical part of filter arrangement F, which in turn is followed by abovementioned converter U, which has an asymmetrically effective parasitic capacitor at the converter output. The asymmetrical filter part has an inductor on the input and output sides for every system phase, the input-side and output-side system inductors of the individual system phases being coupled in each case via a shared magnetic core (current-compensated reactor). Between the input-side and output-side inductors of the asymmetrical filter part, capacitors C21, C22, and C23 are connected in a star connection, at whose star point provision being made in turn for a parallel circuit composed of a further capacitor C2 having a damping resistor R2, via which the star point is connected to system ground PE.

In this context, Ln,a is the asymmetrically effective system inductor and Lk,a is the asymmetrically effective inductor of the commutation reactor. Ca describes the asymmetrically effective parasitic capacitor at the converter output (including power capacity).

In analogy to the above explanation, without a damping resistor R2, a resonance magnification of the asymmetrical currents is also possible here. Resistor R2 can then be chosen such that a magnification of resonance is completely excluded (independent of Ln,a):

$$R > 2 * \sqrt{Lres/Cres} \qquad (3)$$

with Lres, Cres=resulting inductance, capacitance of the series resonant circuit.

If this condition is met, the asymmetrical filter part can be dimensioned such that operation at an IF-protective circuit (Interference Filter) is possible.

The damping properties of the power-line filter described above would be sufficient to satisfy the requirements with respect to system perturbations.

Additionally, using the filter concept of the present invention, another problem can be solved: in converters capable of feedback, undamped oscillations arise between the input and the output side of the converter.

Figure 3:
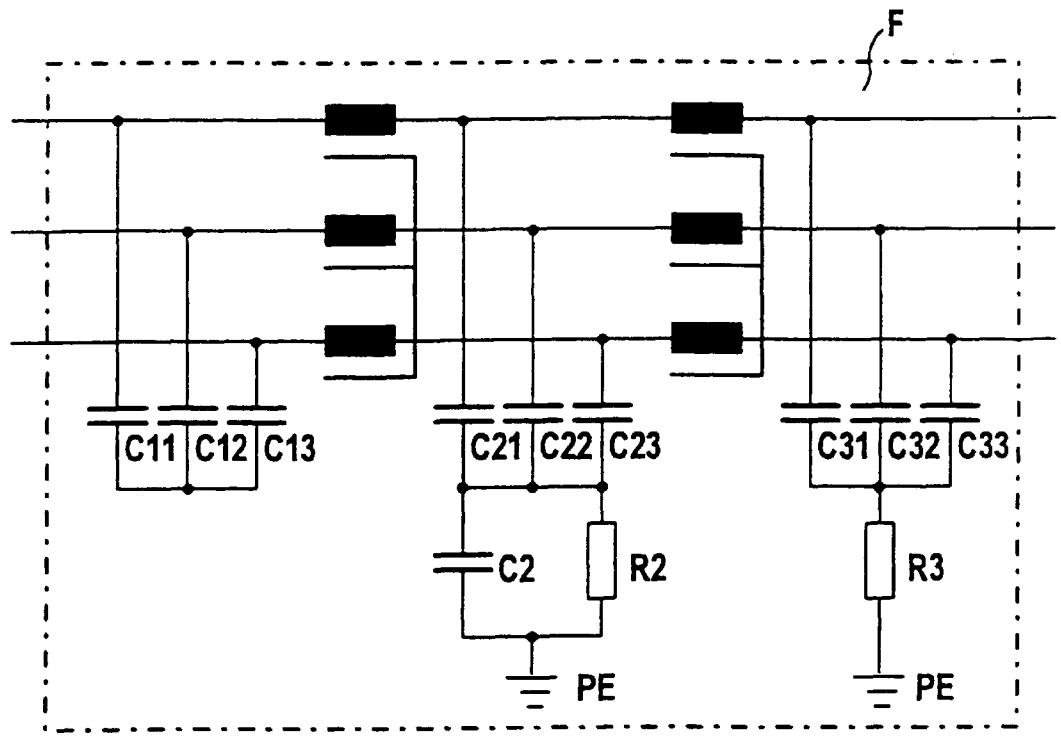
FIG. 3 shows an expansion of the asymmetrical portion for damping the oscillating circuit $C_2$-$L_{k,a}$-Ca in accordance with the present invention.

One filter arrangement suited for solving this problem is shown in the representation in FIG. 3, in the form of an expansion of the asymmetrical filter part for damping the oscillating circuit C2-L-Ca.

In this context, further capacitors C31, C32, and C33 are connected in a star connection downstream of the output-side system inductors of the asymmetrical filter part, whose star point is connected to system ground PE via a further damping resistor R3.

Additionally, at the input side, capacitors C11, C12, and C13 are customarily connected in a star connection between the system phases.

The resonance frequency is essentially determined by the parasitic capacitance of the converter (including the motor leads) with respect to the ground and the asymmetrically effective inductor of the commutating reactor (including, if available, the inductor of the current-compensated reactor on the converter side of the filter).

In order to damp this oscillation as well, a virtual star point is created using capacitors C31, C32 , and C33 (>>Ca) and is connected to ground PE via a further damping resistor R3.

Figure 4:
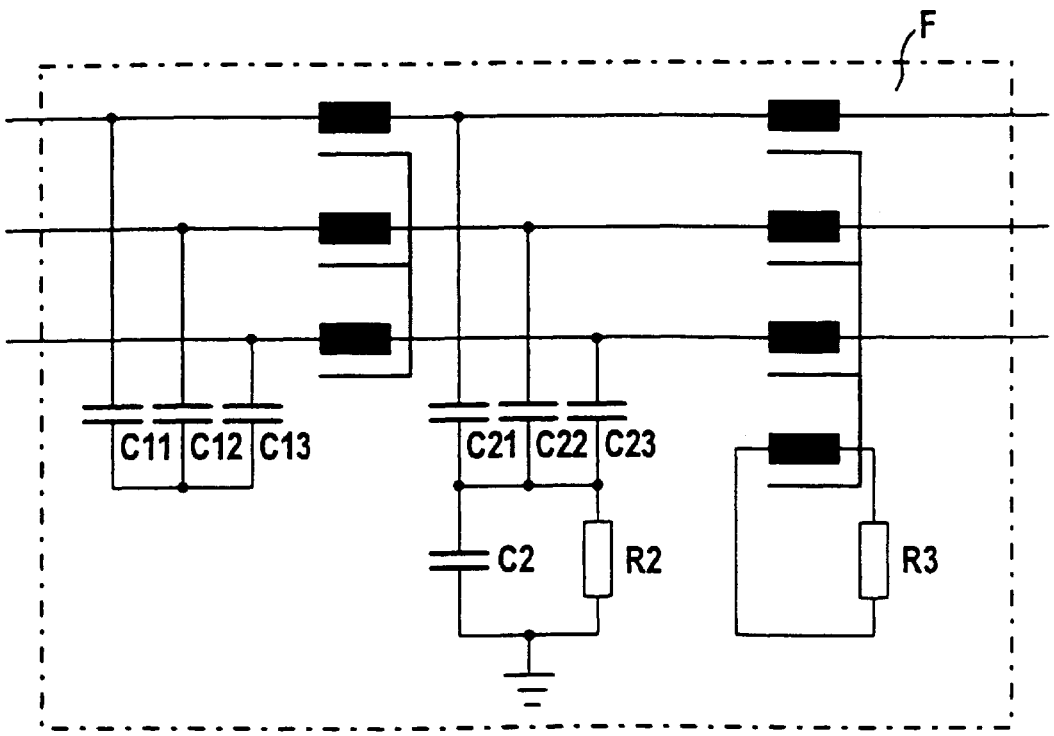
FIG. 4 shows a cost-effective alternative of the filter arrangement shown in FIG. 3 in accordance with the present invention.

The representation according to FIG. 4 shows a cost-effective alternative to the solution depicted in FIG. 3.

In this alternative embodiment, damping resistor R3, which was shown in FIG. 3, is coupled into the circuit as a result of the output-side inductor being expanded, in that provision is made for a fourth winding on the shared magnetic core, which is short-circuited by damping resistor R3.

Therefore, to damp the oscillation, the damping resistor R3 can alternatively be coupled into the circuit via a fourth winding.

Figure 5:
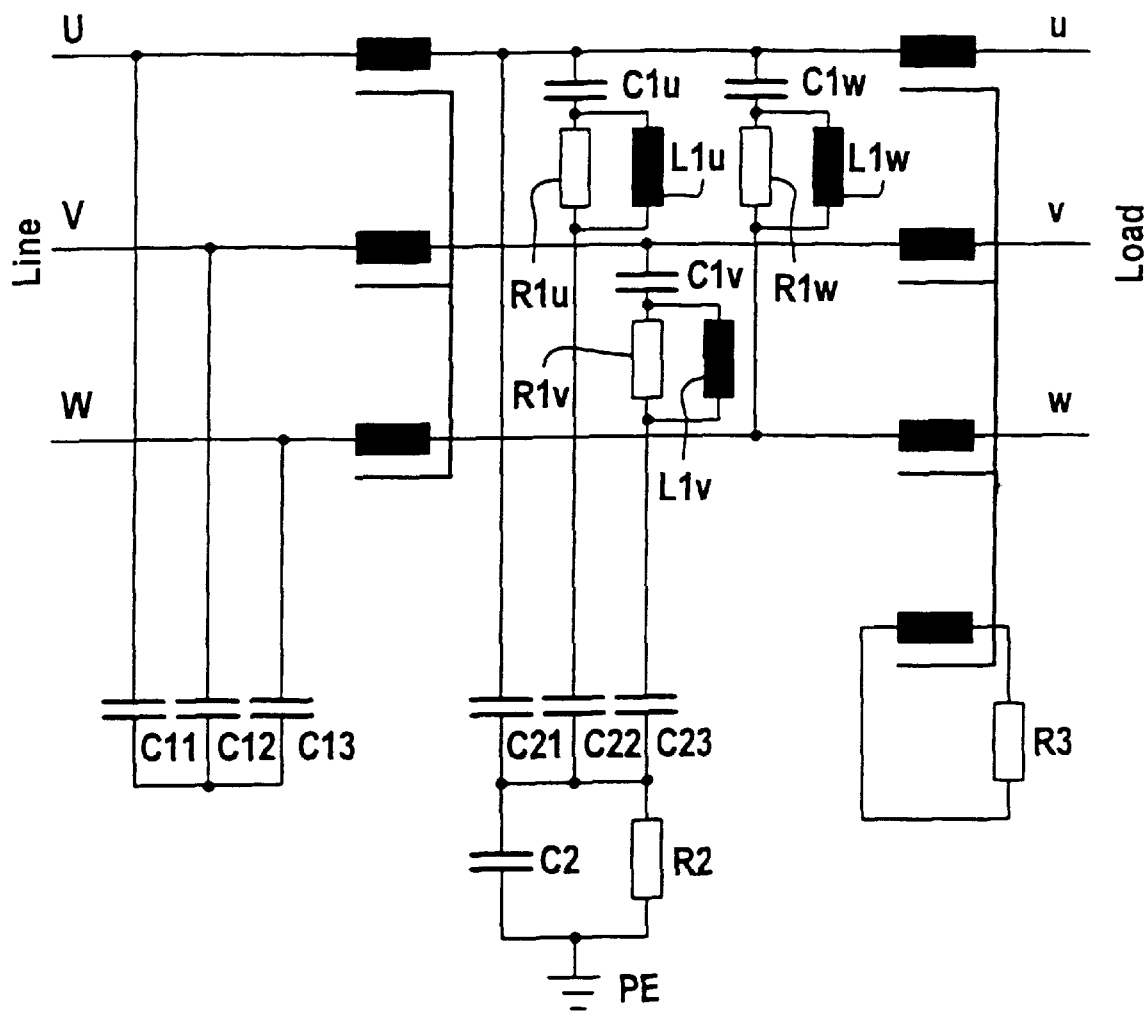
FIG. 5 shows a complete power-line filter according to the present invention.

The representation according to FIG. 5 depicts an exemplary embodiment of the filter arrangement according to the present invention, in which the preceding designs have been included.

In this context, the input of the filter arrangement is designated as LINE and the output as LOAD. All of the filter means described above are found in this complete system filter arrangement. Thus the filter arrangement on the input side customarily has capacitors C11, C12, and C13 connected in a star connection between the system phases. The input-side system inductor follows. For each individual system phase U, V, and W, in each case, in the representation according to FIG. 1, there is depicted a symmetrical filter part that is composed, according to the example of system phase U, of a capacitor C1u and a parallel circuit composed of a damping resistor R1u and an inductor L1u. The other system phases V and W have corresponding symmetrical filter parts.

While a symmetrical filter part of this type for phase W is connected between the phases U and W, the corresponding symmetrical filter parts of phases U and V are connected to capacitors C22 and C23 of the star connection by capacitors C21 through C23 of the asymmetrical filter part. Capacitor C21 of this asymmetrical filter part, on the other hand, leads directly to phase U. The star point of capacitors C21 through C23 is then, in the manner described above, connected to system ground PE via a parallel circuit composed of a further capacitor C2 and a damping resistor R2. Further damping resistor R3, in the manner depicted in the representation according to FIG. 4, is coupled into the circuit via a fourth winding.

In this way, a filter arrangement is created composed of a symmetrical filter part and an asymmetrical filter part, the filter arrangement making it possible to achieve the advantages of the present invention as described above.

What is claimed is:

1. A filter arrangement for damping line-conducted low- and high-frequency system perturbations, the filter arrangement being disposed between a system output and a converter side including an input load, the filter arrangement comprising:

a symmetrical filter part including at least one first capacitor, each of the at least one first capacitor being associated with a respective system phase, the at least one first capacitor reducing an amplitude of an interference voltage, the symmetrical filter part further including a first parallel circuit coupled downstream from the at least one first capacitor, the first parallel circuit including a first damping resistor damping a resonance frequency and a first inductor providing system-frequency recharging currents; and an asymmetrical filter part including second capacitors in a first star connection downstream from the symmetrical filter part, a first star point of the first star connection coupled to ground via a second parallel circuit, the second parallel circuit including a third capacitor and a second damping resistor.

2. The filter arrangement according to claim 1, further comprising:

fourth capacitors coupled, on the converter side, between the system phases in a second star connection, a second star point of the second star connection coupled to ground via a third damping resistor.

3. The filter arrangement according to claim 1, further comprising:

a respective inductor provided for each respective system phase and being coupled on the converter side, the respective inductors having a common core and a further winding for coupling a third damping resistor.

4. The filter arrangement according to claim 1, wherein the second damping resistor has a value $$R > 2 * \sqrt{Lres/Cres}$$

where Lres is a resulting inductance of a series resonant circuit and Cres is a resulting capacitance of the series resonant circuit.

5. The filter arrangement according to claim 1, wherein the second damping resistor includes a PTC resistor.

6. The filter arrangement according to claim 1, wherein the filter arrangement is derived using one of a star-delta transformation and a delta-star transformation.

7. The filter arrangement according to claim 1, wherein the filter arrangement selectively damps in a frequency range of 2 kHz to 150 kHz, and wherein the converter includes a regulated voltage source and provides sinusoidal phase currents.

* * * * *